(12) United States Patent
Huang et al.

(10) Patent No.: US 7,625,508 B2
(45) Date of Patent: *Dec. 1, 2009

(54) APPARATUS AND METHOD FOR MAKING NANOPOWDER

(75) Inventors: Chuan-De Huang, Tu-Cheng (TW); Bor-Yuan Hsiao, Tu-Cheng (TW); Chi-Chuang Ho, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 538 days.

This patent is subject to a terminal disclaimer.

(21) Appl. No.: 11/309,311

(22) Filed: Jul. 25, 2006

(65) Prior Publication Data

US 2007/0077319 A1   Apr. 5, 2007

(30) Foreign Application Priority Data

Sep. 22, 2005   (CN) .................... 2005 1 0037508

(51) Int. Cl.
*B29B 9/00* (2006.01)
(52) U.S. Cl. .................... 264/5; 264/13; 264/14; 425/6; 425/10; 977/896
(58) Field of Classification Search .......... None
See application file for complete search history.

(56) References Cited

U.S. PATENT DOCUMENTS 6,994,837 B2   2/2006   Boulos et al.
2006/0244164 A1*  11/2006   Didenko et al. .............. 264/14

FOREIGN PATENT DOCUMENTS

CN   1400044 A   3/2003

* cited by examiner

*Primary Examiner*—Mary Lynn F Theisen
(74) *Attorney, Agent, or Firm*—Frank R. Niranjan

(57) ABSTRACT

An apparatus (20) for making nanopowder includes a reaction chamber (22), a first sprayer (25, 27), a second sprayer (26, 28) and a centrifuge (24). The reaction chamber includes a top portion (224); a bottom portion (227) opposite to the top portion; a peripheral sidewall (220, 223) interconnecting the top portion and the bottom portion; an inlet (222) formed in the top portion configured for introducing a solvent; and an outlet (229) formed in the bottom portion. The first sprayer is formed on the peripheral sidewall of the reaction chamber configured for spraying a first reactant into the reaction chamber. The second sprayer is formed in at least one of the top and bottom portions of the reaction chamber configured for spraying a second reactant into the reaction chamber. The centrifuge is connected with the outlet of the reaction chamber.

16 Claims, 2 Drawing Sheets

APPARATUS AND METHOD FOR MAKING NANOPOWDER

FIELD OF THE INVENTION

The present invention relates to apparatuses and methods for making nanopowder, and more particularly to an apparatus for making nanopowder and a method for making nanopowder using the apparatus.

DESCRIPTION OF THE PRIOR ART

Nanomaterials can be divided into four categories as nanopowders, nanofibers, nanofilms and nanoblocks. Nanofilms and nanoblocks are generally formed from nanopowders. Therefore, the synthesis of nanopowders is very important. Synthesis techniques for nanopowders can be generally divided into vapor deposition methods and liquid deposition methods. Vapor deposition methods can be used to form high-purity nanopowders. However, vapor deposition methods have relatively low production capabilities and require high energy consumptions, and are therefore seldom used. Of liquid deposition methods, the precipitation reaction method is perhaps most widely used. The precipitation reaction method can be used to accurately control composition of a compound during processing, whilst also achieving uniform mixing at the atomic or molecular level, and can be employed for synthesizing particles of single composition or multi-constituent compounds.

However, the precipitation reaction method is generally accomplished in an agitator tank or a stirred-tank reactor. In the agitator tank or the stirred-tank reactor, precipitation reactions cannot be properly conducted, and utilization ratios of reactants are relatively low. In addition, sizes of particles are relatively large and liquid-liquid mixings on the micro level cannot be mixed uniformly. Nanopowders cannot disperse uniformly and are prone to congregate, which results in even larger particle sizes of the nanopowders.

What is needed, therefore, is an apparatus for making nanopowder which synthesizes super-small nanopowders.

SUMMARY OF THE INVENTION

An apparatus for making nanopowder according to a preferred embodiment includes a reaction chamber, a first sprayer, a second sprayer and a centrifuge. The reaction chamber includes a top portion; a bottom portion opposite to the top portion; a peripheral sidewall interconnecting the top portion and the bottom portion; an inlet formed in the top portion configured for introducing a solvent into the reaction chamber; and an outlet formed in the bottom portion. The first sprayer is formed on the peripheral sidewall of the reaction chamber configured for spraying a first reactant into the reaction chamber. The second sprayer is formed in at least one of the top and bottom portions of the reaction chamber configured for spraying a second reactant into the reaction chamber. The centrifuge is connected with the outlet of the reaction chamber.

A method for making nanopowder according to another preferred embodiment includes the steps of:

providing an apparatus as described above;

spraying a first reactant and a second reactant into the reaction chamber via the first sprayer and the second sprayer respectively, so as to effect a reaction between the first and second reactants thereby producing nanopowder in the reaction chamber;

introducing a solvent into the reaction chamber to rinse the reaction chamber, thereby the solvent carrying the produced nanopowder and the unreacted first and second reactants into the centrifuge;

operating the centrifuge so as to promote reaction between the unreacted first and second reactants and separating the nanopowder from the solvent.

An apparatus for making nanopowder according to another preferred embodiment includes a reaction chamber, at least one first sprayer, at least one second sprayer and a centrifuge. The reaction chamber includes a top portion, a bottom portion, a peripheral sidewall extending from the top portion and the bottom portion, at least one inlet arranged adjacent to the top portion configured for introducing a solvent into the reaction chamber, and an outlet arranged adjacent to the bottom portion. The reaction chamber tapers from the top portion to the bottom portion. The at least one first sprayer is arranged on the peripheral sidewall of the reaction chamber configured for spraying a first reactant into the reaction chamber. The at least one second sprayer is arranged adjacent to at least one of the top and bottom portions of the reaction chamber configured for spraying a second reactant into the reaction chamber. The second reactant is configured for reaction with the first reactant. The centrifuge is in communication with the outlet of the reaction chamber.

The present apparatus and method for making nanopowder employ the first and second sprayers to spray reactants, the sprayed reactants have high specific area and react with each other via a high efficiency liquid-liquid reaction on the micro level uniformly, and the resulting grain sizes of the nanopowder is very small. Furthermore, with the centrifuge using, the first and second reactants can promote reaction therebetween, it improves the efficiency of reaction of the reactants, and the centrifuge can separate the nanopowders from the solvent. In addition, as the second sprayer is arranged on the bottom surface, the second reactant is sprayed into the reaction chamber from bottom to top. Therefore, reaction time of the first and second reactants increases, the reactants can react substantially and be fully used.

Other advantages and novel features will become more apparent from the following detailed description of the present apparatus for making nanopowder, when taken in conjunction with the accompanying drawings.

BRIEF DESCRIPTION OF THE DRAWINGS

Many aspects of the present apparatus and method for making nanopowder can be better understood with reference to the following drawings. The components in the drawings are not necessarily to scale, the emphasis instead being placed upon clearly illustrating the principles of the present apparatus for making nanopowder. Moreover, in the drawings, like reference numerals designate corresponding parts throughout the several views.

DETAILED DESCRIPTION OF THE INVENTION

Reference will now be made to the drawings to describe a preferred embodiment of the present apparatus for making nanopowder in detail.

Figure 1:
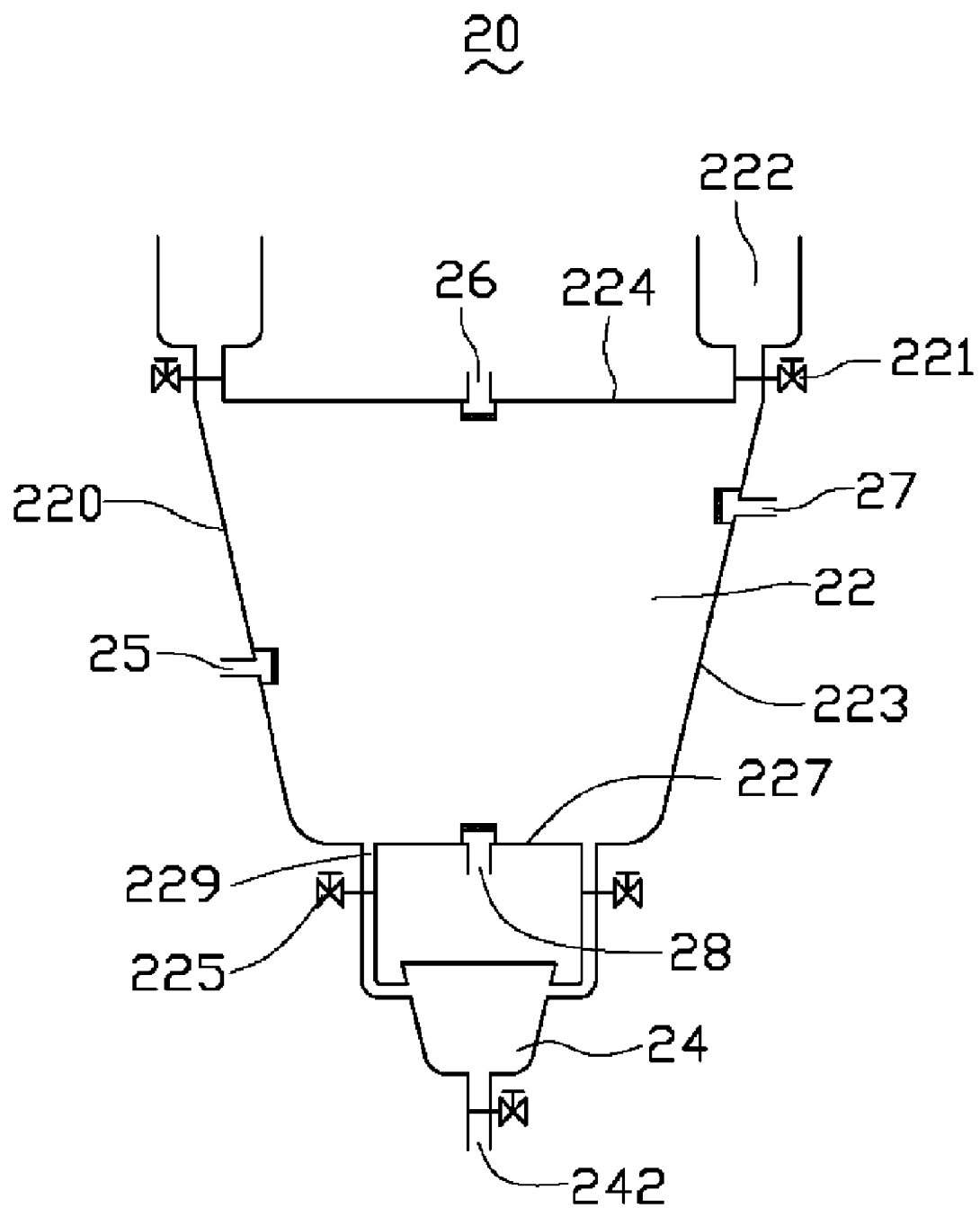
FIG. 1 is a schematic, side view of an apparatus for making nanopowder in accordance with a first preferred embodiment.

Referring to FIG. 1, an apparatus 20 for making nanopowder in accordance with a first preferred embodiment is shown. The apparatus 20 includes a reaction chamber 22 having an inverted-trapezoid-shaped cross-section or an inverted-triangle-shaped cross-section, two first sprayers 25, 27, two second sprayers 26, 28 and a centrifuge 24 connected with the reaction chamber 22.

The reaction chamber 22 includes a top portion 224, a bottom portion 227 positioned opposite to the top portion 224, a first sidewall 220 and a second sidewall 223 interconnecting the top portion 224 and the bottom portion 227. The top portion 224 has a larger area than the bottom portion 227. The reaction chamber 22 further includes an inlet 222 formed in the top portion 224 configured for introducing a solvent, and an outlet 229 formed in the bottom portion 227 configured for releasing the solvent. The inlet 222 is arranged adjacent to the first sidewall 220 and the second sidewall 223 for introducing the solvent to rinse the first sidewall 220 and the second sidewall 223. The inlet 222 includes a valve 221, the outlet 229 includes a valve 225.

The two first sprayers 25, 27 are arranged on the first sidewall 220 and the second sidewall 223 respectively. The first sprayers 25, 27 have a plurality of spiracles of less than 1 micrometer across for spraying a first atomizing reactant into the reaction chamber 22. The first sprayers 25, 27 may spray a same first atomizing reactant or a different first atomizing reactant as necessary. The two first sprayers 25, 27 are both connected with respective pumps (not shown) for supplying the first atomizing reactant. The two first sprayers 25, 27 are arranged at different levels on the first sidewall 220 and the second sidewall 223 respectively.

The two second sprayer 26, 28 are arranged on the top portion 224 and the bottom portion 227 respectively. The second sprayers 26, 28 have a plurality of nanospiracles of less than 1 micrometer across for spraying a second atomizing reactant into the reaction chamber 22. The two second sprayers 26, 28 may spray a same second atomizing reactant or a different second atomizing reactant as necessary. The second sprayers 26, 28 are connected with a respective pump (not shown) for supplying the second atomizing reactant.

Furthermore, a flow controller can be set between the sprayers 25, 26, 27, 28 and their respective pumps for controlling the flow of the reactant.

The centrifuge 24 is arranged under the reaction chamber 22 and connected with the outlet 229 of the reaction chamber 22, and is configured for promoting reaction between the unreacted first and second reactant and improving the efficiency of the reaction. The centrifuge 24 can also separate the nanopowder from the solvent. The centrifuge 24 can be a high speed centrifuge or a super high speed centrifuge. The centrifuge 24 includes an outlet 242 configured for releasing the solvent. The centrifuge 24 further includes a valve.

In operation, the first and second reactants are pressurized and pumped to the first sprayers 25, 27 and the second sprayers 26, 28 respectively. The first sprayers 25, 27 and the second sprayers 26, 28 atomize the provided first and second reactants into the reaction chamber 22. Therefore, the first and second reactants can react with each other properly to form nanopowders.

Then, the solvent flows into the reaction chamber 22 via the inlet 222. The solvent is configured for rinsing the reaction chamber 22. The solvent carrys the produced nanopowder and the unreacted first and second reactant into the centrifuge 24. The solvent may be a water-soluble solvent, such as water, ethanol, etc. The solvent also may be an oil-soluble solvent, such as acetone, ethyl ether, trichloromethane, ethyl acetate, etc. The solvent can rinse the first sidewall 220 and the second sidewall 223 as the inlet 222 is adjacent to the first sidewall 220 and the second sidewall 223.

Finally, with the centrifuge 24 operating, the unreacted first and second reactants which flow into the centrifuge 24 can further react with each other substantially to form nanopowder. Furthermore, the centrifuge 24 can separate the nanopowder from the solvent. The nanopowder is left on the sidewall of the centrifuge 24, and the solvent is released from the outlet 242 of the centrifuge 24.

Figure 2:
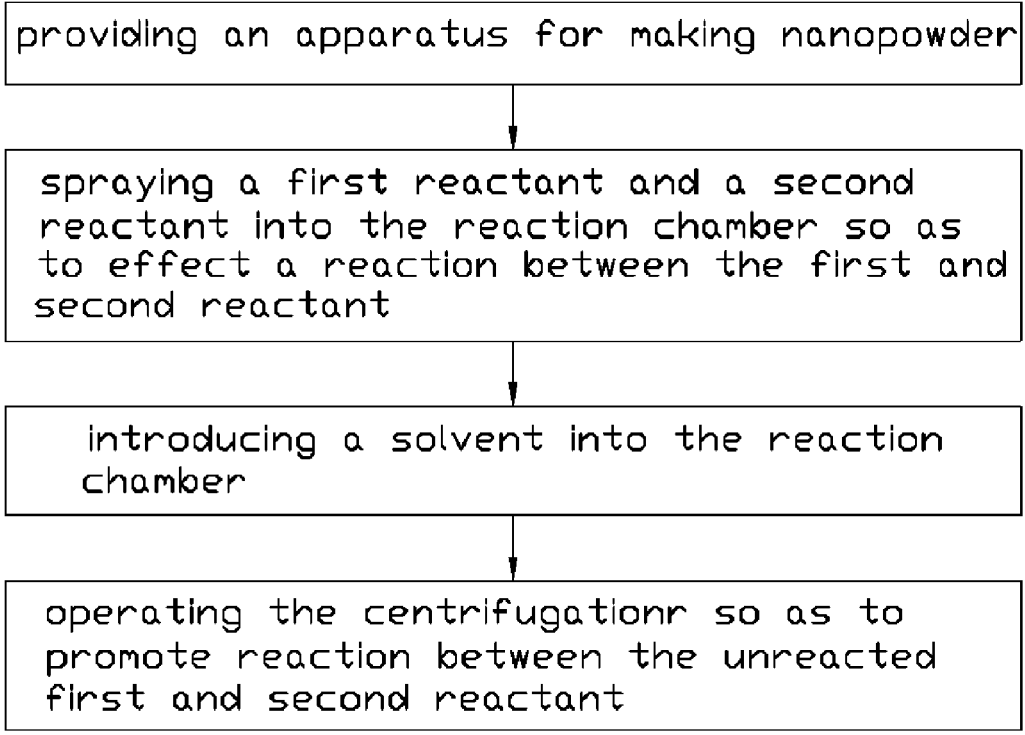
FIG. 2 is a flow chart of a method for making nanopowder using the apparatus of FIG. 1.

Referring to FIG. 2, a method for making nanopowder in accordance with a second preferred embodiment is shown. The method includes the flowing steps:

providing an apparatus as above;

spraying a first reactant and a second reactant into the reaction chamber via the first sprayer and the second sprayer respectively, so as to make a reaction between the first and second reactant thereby producing nanopowder in the reaction chamber;

introducing a solvent into the reaction chamber to rinse the reaction chamber, the solvent then carrying the produced nanopowder and the unreacted first and second reactant into centrifuge;

operating the centrifuge so as to promote reaction between the unreacted first and second reactant and separating the nanopowder from the solvent.

Referring also to FIG. 1, the method for making nanopowder in accordance with the preferred embodiment is described below by reference to examples.

EXAMPLE 1

A method for producing metal nanopowder is described as follows.

Firstly, an apparatus 20 as shown in FIG. 1 is provided.

Secondly, a first reactant is sprayed into the reaction chamber 22 from the first sprayer 25, 27, and a second reactant is sprayed into the reaction chamber 22 from the second sprayer 26, 28. The first reactant is a water solution of $M^{m+}$ (M denotes metals such as silver, gold etc., m=1, 2, or 3) ions, the second reactant a water solution of BH4—(Borohydride Anion) anions. A reaction of the sprayed first and second reactants can be shown by following reaction formula:

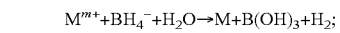

$$M^{m+}+BH_4^-+H_2O \rightarrow M+B(OH)_3+H_2;$$

A metal nanopowder M is thereby obtained.

Thirdly, the pure water is introduced into the reaction chamber 22 to rinse the reaction chamber 22 and make the water with the producing nanopowder flow into the centrifuge 24. Naturally, the solvent with the metal nanopowders suspended therein may further include the $M^{m+}$ ions and $BH_4^-$ anions.

When the centrifuge 24 is operated, the unreacted $M^{m+}$ ions and $BH_4^-$ anions further react with each other in the centrifuge 24 to produce the metal nanopowder M. Furthermore, the centrifuge 24 separates the metal nanopowder M from the water. The metal nanopowder can have an average grain size in a range from 80 nanometers to 150 nanometers.

EXAMPLE 2

A method for synthesizing TiO2 (Titanium Dioxide) nanopowder is provided. The method of example 2 is similar to that of example 1. However, in example 2, the first reactant employs a $TiCl_4$ (Titanium Tetrachloride) solution, the second reactant employs excess ammonia water, the solvent employs pure water. From the first and second reaction, $Ti(OH)_4$ (Titanium Hydroxide) can be obtained. $TiO_2$ nanopowder can be obtained by a further calcination step for calcining the $Ti(OH)_4$. The $TiO_2$ nanoparticles have an average grain size in a range from 20 nanometers to 60 nanometers.

EXAMPLE 3

A method for synthesizing $BaTiO_3$ (Barium Titanate) nanopowder is provided. The method of example 3 is similar to that of example 1. However, in example 2, the first reactant employs a $BaCl_2$ (Barium Chloride) solution and a $TiCl_4$ (Titanium Tetrachloride) solution with a same concentration to $BaCl_2$ solution. The $TiCl_4$ (Titanium Tetrachloride) solution is sprayed by the first sprayer 27, and the $BaCl_2$ solution is sprayed by the first sprayer 22. The second reactant employs excess $C_2O_4^{2-}$ (oxalate ion) solution, and the solvent employs pure water. From the first and second reaction, $BaTiO(C_2O_4)_2 \cdot 4H_2O$ can be obtained. $BaTiO_3$ nanopowders are obtained by a calcination step for calcining the $BaTiO(C_2O_4)_2 \cdot 4H_2O$. The $BaTiO_3$ nanoparticles have an average grain size in a range from 30 nanometers to 80 nanometers.

As stated above, the apparatus and method in accordance with a preferred embodiment employs the first and second sprayers, the sprayed reactants have high specific area and react with each other via a high efficiency liquid-liquid reaction, and as a result, a grain size of the nanopowder produced is very small. Furthermore, with the centrifuge, the first and second reactants can undergo further reaction with each other, thus improving the efficiency of reaction, and the centrifuge can separate the synthesised nanopowder from the solvent. In addition, as the second sprayer 28 is arranged on the bottom surface, the second reactant is sprayed into the reaction chamber from bottom to top. Therefore, reaction time between the first and second reactants increases, and the reactants can be fully used.

It is to be understood that the above-described embodiment is intended to illustrate rather than limit the invention. Variations may be made to the embodiment without departing from the spirit of the invention as claimed. The above-described embodiments are intended to illustrate the scope of the invention and not restrict the scope of the invention.

What is claimed is:

1. An apparatus for making nanopowder, comprising:
    a reaction chamber comprising:
        a top portion;
        a bottom portion opposite to the top portion;
        a peripheral sidewall interconnecting the top portion and the bottom portion;
        an inlet formed in the top portion configured for introducing a solvent into the reaction chamber; and
        an outlet formed in the bottom portion;
    a first sprayer formed on the peripheral sidewall of the reaction chamber configured for spraying a first reactant into the reaction chamber;
    a second sprayer formed on at least one of the top and bottom portions of the reaction chamber configured for spraying a second reactant into the reaction chamber;
    a centrifuge connected with the outlet of the reaction chamber.

2. The apparatus as claimed in claim 1, wherein the top portion of the reaction chamber has a larger area than the bottom portion of the reaction chamber.

3. The apparatus as claimed in claim 1, wherein the reaction chamber has one of an inverted-triangle-shaped cross-section and an inverted-trapezoid-shaped cross-section.

4. The apparatus as claimed in claim 1, wherein the centrifuge comprises an outlet configured for releasing the solvent without releasing the nanopowder.

5. The apparatus as claimed in claim 1, wherein the centrifuge is one of a high speed centrifuge and a super high speed centrifuge.

6. A method for making nanopowder comprising the steps of:
    providing an apparatus as claimed in claim 1;
    spraying a first reactant and a second reactant into the reaction chamber via the first sprayer and the second sprayer respectively, so as to make a reaction between the first and second reactant thereby producing nanopowder in the reaction chamber;
    introducing a solvent into the reaction chamber to rinse the reaction chamber such that the solvent carries the produced nanopowder and the unreacted first and second reactant therewith into the centrifuge;
    operating the centrifuge so as to promote reaction between the unreacted first and second reactant and separating the nanopowder from the solvent.

7. The method as claimed in claim 6, wherein the solvent is introduced via the inlet formed on the top portion of the reaction chamber.

8. The method as claimed in claim 6, wherein the solvent is a water-soluble solvent.

9. The method as claimed in claim 8, wherein the solvent is selected from a group consisting of water and ethanol.

10. The method as claimed in claim 6, wherein the solvent is an oil-soluble solvent.

11. The method as claimed in claim 10, wherein the solvent is selected from a group consisting of acetone, ethyl ether, trichloromethane, and ethyl acetate.

12. The method as claimed in claim 8, wherein the nanopowder has an average grain size in a range from 20 nanometers to 150 nanometers.

13. An apparatus for making nanopowder, comprising:
    a reaction chamber comprising:
        a top portion;
        a bottom portion;
        a peripheral sidewall extending from the top portion to the bottom portion;
        at least one inlet arranged adjacent to the top portion configured for introducing a solvent into the reaction chamber; and
        an outlet arranged adjacent to the bottom portion, the reaction chamber tapering from the top portion to the bottom portion;
    at least one first sprayer arranged on the peripheral sidewall of the reaction chamber configured for spraying a first reactant into the reaction chamber;
    at least one second sprayer arranged adjacent to at least one of the top and bottom portions of the reaction chamber configured for spraying a second reactant into the reaction chamber, the second reaction being configured for reaction with the first reactant; and
    a centrifuge in communication with the outlet of the reaction chamber.

14. The apparatus as claimed in claim 13, wherein the at least one inlet is two inlets configured for introducing a first and second solvent, respectively.

15. The apparatus as claimed in claim 13, wherein the at least one first sprayer has two first sprayers both configured for introducing the first solvent, the two first sprayers being arranged at different levels on the peripheral sidewall.

16. The apparatus as claimed in claim 13, wherein the at least one second sprayers has two second sprayers, the two second sprayers being aligned with each other.

* * * * *

UNITED STATES PATENT AND TRADEMARK OFFICE
CERTIFICATE OF CORRECTION

PATENT NO. : 7,625,508 B2 Page 1 of 1
APPLICATION NO. : 11/309311
DATED : December 1, 2009
INVENTOR(S) : Huang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 667 days.

Signed and Sealed this

Second Day of November, 2010

David J. Kappos
*Director of the United States Patent and Trademark Office*